United States Patent [19]

König et al.

[11] 4,427,798
[45] Jan. 24, 1984

[54] SOLUTIONS OF OLIGO-URETHANE ETHERS IN POLYETHER POLYOLS AND THEIR USE IN A PROCESS FOR THE PRODUCTION OF POLYURETHANE FOAMS

[75] Inventors: Klaus König, Leverkusen; Gernot Becker, Dormagen; Peter Seifert, Bergisch-Gladbach, all of Fed. Rep. of Germany

[73] Assignee: Bayer Aktiengesellschaft, Leverkusen, Fed. Rep. of Germany

[21] Appl. No.: 356,877

[22] Filed: Mar. 10, 1982

[30] Foreign Application Priority Data

Mar. 19, 1981 [DE] Fed. Rep. of Germany ....... 3110724

[51] Int. Cl.$^3$ .............................................. C08G 18/14
[52] U.S. Cl. .................................. 521/173; 252/182; 521/176; 524/762; 525/409; 525/457
[58] Field of Search ................. 521/173, 176; 524/762; 252/182; 525/409, 457

[56] References Cited

U.S. PATENT DOCUMENTS

| | | | |
|---|---|---|---|
| 3,205,120 | 9/1965 | Flanders | 161/160 |
| 3,360,495 | 12/1967 | Muller et al. | 528/85 |
| 3,497,416 | 2/1970 | Critchfield et al. | 161/190 |
| 4,060,439 | 11/1977 | Rosemund et al. | 156/78 |
| 4,120,834 | 10/1978 | Fatutto | 521/164 |
| 4,324,716 | 4/1982 | Reischl et al. | 524/761 |
| 4,371,630 | 2/1983 | König et al. | 252/182 |
| 4,374,209 | 2/1983 | Rowlands | 525/409 |

FOREIGN PATENT DOCUMENTS 1553760 10/1979 United Kingdom.

*Primary Examiner*—Maurice J. Welsh
*Attorney, Agent, or Firm*—Gene Harsh; Joseph C. Gil

[57] ABSTRACT

The invention relates to solutions of
(A) from 3 to 60% by weight, based on the combined ether-polyol content, of separately prepared oligo-urethane ethers containing terminal OH$^-$ groups in the form of reaction products of
  (a) diisocyanates with
  (b) dialcohols having an average molecular weight of from 200 to 800, the stoichiometric ratio of (a) to (b) amounting to various values based on the average molecular weight of the dialcohols,
in
(B) polyether polyols containing at least 2 hydroxyl groups and having an average molecular weight of from 1000 to 12,000 and to their use in a proess for the production of polyurethane foams capable of being effectively flame-laminated and (high-frequency) welded without any adverse effect upon their other properties. The process for producing flame-laminatable and high-frequency-weldable flexible polyurethane foams is characterized by the reaction of
  (i) polyisocyanates with
  (ii) relatively high molecular weight compounds containing at least 2 hydroxyl groups,
  (iii) optionally other relatively high molecular weight and/or low molecular weight compounds containing isocyanate-reactive hydrogen atoms and water,
  (iv) optionally in the presence of other blowing agents, catalysts, foam stabilizers and other additives, such solutions described above being exclusively or partly used as the relatively high molecular weight compounds which contain hydroxyl groups.

4 Claims, No Drawings

SOLUTIONS OF OLIGO-URETHANE ETHERS IN POLYETHER POLYOLS AND THEIR USE IN A PROCESS FOR THE PRODUCTION OF POLYURETHANE FOAMS

BACKGROUND OF THE INVENTION

This invention relates to solutions of separately-prepared oligo-urethane ethers containing terminal OH-groups in relatively high molecular weight polyethers containing terminal hydroxyl groups and to the use of these solutions as modified polyols in the production of polyurethane foams characterized by excellent high-frequency weldability and flame-laminatability.

Applications where high-frequency weldability is a particularly desirable property include, for example, the production of door linings for motor vehicles, in which sheets of foam have to be welded to one another or to other materials; the manufacture of articles with quilted surface appearances; or the production of moldings. In addition, flame lamination is used for the production of composite systems of foams with textiles, such as in upholstery backings which are subsequently profiled and/or formed by high-frequency (e.g. where the welding energy is provided by an electromagnetic field). (HF welding).

It is known that flame-laminatable and, to a certain extent, high-frequency-weldable foams can be produced from polyisocyanates and polyester polyols using suitable auxiliaries and additives. However, these foams can only be produced in special processing machines and are inferior in many properties to polyether-polyurethane foams. For example, their open-cell structure is poorer, their elasticity lower and their resistance to moisture and heat inferior.

Flame-laminatable and high-frequency-weldable polyurethane foams can be produced from polyether polyols, polyisocyanates, water and/or blowing agents in the presence of emulsifiers, stabilizers, catalysts and other auxiliaries, by the addition of special auxiliaries.

Thus, U.S. Pat. No. 3,205,120 describes the production of flame-laminatable polyether-polyurethane foams by the addition of a relatively small quantity of a polyol (particularly phosphorous-containing polyols, such as tris-(dipropylene glycol)-phosphite) having a molecular weight in the range from 200 to 1500. Disadvantages of this process include a deterioration in processing reliability, a certain tendency towards core-discoloration and a flame-lamination behavior which is distinctly inferior to that of a polyester-polyurethane foam because of the polyol quantities normally used.

U.S. Pat. No. 4,060,439 describes the cofoaming of small quantities of alkylene glycols containing from 2 to 8 carbon atoms, or triols containing from 3 to 10 carbon atoms, dialkanolamines containing from 2 to 10 carbon atoms with short-chain glycol ethers and polyhydric phenols into flexible polyether foam formulations. However, experience has shown that the co-foaming of compounds such as these makes foaming more difficult and, in particular, very considerably narrows the processing gap between an open-cell and a closed-cell structure.

In addition, U.S. Pat. No. 3,497,416 describes the foaming of a polyether polyol with a modified polyisocyanate (the reaction product of dipropylene glycol and/or dibutylene glycol with an excess of polyisocyanate) for the production of a weldable polyurethane foam. The disadvantage of this process lies in the fact that, to obtain sufficient open cells, dimethyl formamide —a toxicologically-unacceptable substance, has to be used as cell-opening agent. In addition, foams of this type have a high compression set, and polyether-NCO-prepolymers of this type used show only moderate stability in storage.

In view of the disadvantages of polyether-polyurethane foams which account for the fact that, on the whole, polyester-polyurethane foams are used for flame lamination and for high-frequency welding, there is a considerable need for a flame-laminatable and high-frequency (HF)-weldable polyether foam which can be manufactured safely.

Solutions of polyisocyanate-polyaddition compounds in polyols are also known. Thus, German Offenlegungsschrift No. 2,638,759 describes solutions of this type having solids contents of from 5 to 70%, by weight, which are obtained by either reacting diisocyanates with H-active compounds (including, among many others, diprimary diols) in polyhydric alcohols having a molecular weight of from 62 to 450 (but generally, from 62 to around 200) as reaction medium or by subsequently dissolving the powdered, separately-produced polyaddition compounds in the polyhydric alcohols.

Although solutions of this type may frequently be used as starting materials in the production of polyurethane plastics, they are not suitable for the production of flexible coatings and, in particular, flexible foams. The introduction of significant amounts of the polyaddition compound into the polyurethane foam formulation is only possible if relatively large quantities of the low molecular weight polyhydric alcohols (the solvents) are used at the same time. This seriously affects processing reliability in the manufacture of flexible foams (effecting the critical links between open-cell structure and shrinkage properties) or it makes the production of an open-cell flexible foam completely impossible.

It has now suprisingly been found that oligourethane ethers containing terminal OH-groups of diisocyanates and dihydric, relatively short-chain polyether diols form clear, stable solutions in relatively high molecular weight, polyhydric polyether polyols optionally at elevated temperature- and that solutions of this type may readily be processed into flexible foams characterized by good mechanical properties and by good high-frequency weldability.

DESCRIPTION OF THE INVENTION

Accordingly, the present invention relates to solutions of (A) from 3 to 60%, by weight, and preferably from 5 to 30%, by weight, based on the combined ether-polyol content, of separately prepared oligo-urethane ethers containing terminal OH-groups which are the reaction products of (a) organic diisocyanates with (b) short-chain polyether diols having an average molecular weight of from 200 to 800, and preferably from 200 to 600, the stoichiometric ratio of (a) to (b) being between 0.5 and 0.7 in the case of diols having an average molecular weight of from 200 to 280; to between 0.5 and 0.9 in the case of diols having an average molecular weight of from 280 to 600; and to between 0.5 and 0.75 in the case of diols having an average molecular weight of from 600 to 800, in (B) polyether polyols containing at least two hydroxyl groups and having an average molecular weight of from 1000 to 12,000, and preferably from 2000 to 8000.

The present invention also relates to a process for the production of flame-laminatable and high-frequency weldable flexible polyurethane foams by reacting polyisocyanates with relatively high molecular weight compounds containing at least two hydroxyl groups, optionally other relatively high and/or low molecular weight compounds containing isocyanate-reactive hydrogen atoms, and water, optionally in the presence of other blowing agents, catalysts, foam stabilizers and other additives. The solutions according to the invention are exclusively or partially used as the relatively high molecular weight compound.

Organic diisocyanates suitable for use in the preparation of the solutions according to the invention are aliphatic, cycloaliphatic, araliphatic, aromatic and heterocyclic diisocyanates. Appropriate diisocyanates are of the type described, for example, by W. Siefken in Justus Liebigs Annalen der Chemie, 562, pages 75 to 136, for example, those corresponding to the formula: Q (NCO)$_2$ in which "Q" is an aliphatic hydrocarbon radical containing from 2 to 18, and preferably from 6 to 10 C-atoms; a cycloaliphatic hydrocarbon radical containing from 4 to 15, and preferably from 5 to 10 C-atoms; an aromatic hydrocarbon radical containing from 6 to 15, and preferably from 6 to 13 C-atoms; or an araliphatic hydrocarbon radical containing from 8 to 15, and preferably from 8 to 13 C-atoms. Examples of such diisocyanates include 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane; 2,4- and 2,6-hexahydrotolylene diisocyanate; hexahydro-1,3- and/or -1,4-phenylene diisocyanate; perhydro-2,4'- and/or -4,4'-diphenylmethane diisocyanate and mixtures of these position and/or stereoisomers; and 1,3- and 1,4- phenylene diisocyanate; 2,4- and/or 2,6-tolylene diisocyanate; diphenyl methane-2,4'- and/or -4,4'-diisocyanate and mixtures of these isomers.

Preferred diisocyanates for use in the production of the oligo-urethane ethers are the isomeric tolylene diisocyanates and diphenyl methane diisocyanates; hexamethylene diisocyanate; dicyclohexyl methane diisocyanates; and 1-isocyanato-3,3,5-trimethyl-5-isocyanatomethyl cyclohexane or mixtures of these isocyanates. Particularly preferred are 2,4- and/or 2,6-tolylene diisocyanate and the diphenyl methane diisocyanates and their nucleus-alkylated derivatives.

The oligo-urethane ethers (A) containing terminal hydroxyl groups which are dissolved (optionally, at elevated temperature) in accordance with the invention in relatively high molecular weight polyhydric polyether polyols (B) are formed by separately reacting the diisocyanates (a) described in the foregoing with short-chain polyether diols (b) having an average molecular weight of from 200 to 800. Polyether diols of this type are produced in the known manner, for example, by the alkali-catalyzed polymerization of propylene oxide, optionally together with ethylene oxide (preferably up to 50 mole percent of ethylene oxide) onto starter compounds preferably containing two reactive hydrogen atoms. Suitable starter compounds include, for example, water or dihydric diols, such as ethylene glycol; 1,2- or 1,3-propylene glycol; 1,2-, 1,3- or 1,4-butylene glycol; 1,6-hexane diol; 1,8-octane diol; neopentyl glycol; 1,4-bis-hydroxymethyl cyclohexane; methyl-1,3-propane diol; resorcinol; hydroquinone; or 2,2-bis(4-hydroxyphenyl)-propane. Monoamines such as methyl amines, stearyl amine, cyclohexyl amine, aniline and mixtures of these compounds are also suitable.

It is particularly preferred to use polyether diols having an average molecular weight of from 200 to 600, especially polypropylene glycols which may contain up to 30 mole percent of ethylene oxide units.

Relatively high molecular weight polyether polyols having molecular weights in the range from 1000 to 12,000 (preferably in the range of from 2000 to 8000) are obtained in known manner, for example, by the alkali-catalyzed polymerization of propylene oxide, optionally together with up to 60 mole percent, and preferably with up to 30 mole percent, of ethylene oxide, onto dihydric or polyfunctional starter compounds containing reactive hydrogen atoms. Examples of suitable starter compounds include water; ethylene glycol; 1,2- or 1,3-propylene glycol; 1,2-, 1,3- or 1,4- butylene glycol; 1,6-hexane diol; 1,8-octane diol; neopentyl glycol; 1,4-bis-hydroxymethyl cyclo-hexane; 2-methyl-1,3-propane diol; glycerol; trimethylol ethane and propane; pentaerythritol; mannitol; sorbitol; formitol; and cane sugar. Additional examples include resorcinol; hydroquinone; 2,2-bis-(4-hydroxy-phenyl)- propane; ammonia; methylamine; ethylene diamine; tetramethylene or hexamethylene diamine; ethanolamine; diethanolamine; triethanolamine; aniline; 2,4- and 2,6-diaminotoluene; and polyphenyl polymethylene polyamines of the type obtained by condensing aniline with formaldehyde, and also mixtures of these compounds. Other suitable starters are resin-like materials of the novolak and resol type.

Additional suitable polyether polyols are described in terms of their composition and modification in German Offenlegungsschrift No, 2,920,501.

Other polyhydroxyl components suitable for use in the production of foams by standard methods are described, for example, in German Offenlegungsschrift No: 2,854,384, page 14 and pages 16 to 19; other low molecular weight compounds are described on pages 20 to 25 of that reference; and other polyisocyanates suitable for foam formation are described on pages 8 to 11 of that reference.

The reaction of the diisocyanates with the dialcohols by which the oligo-urethane ethers are separately produced is carried out in known manner at temperatures in the range of from about 0° to 200° C., and preferably at temperatures in the range of from 30° to 150° C. For example, the hydroxyl component may be initially introduced and the diisocyanate added either all at once or gradually, the temperature being kept constant by external or internal cooling or to rise under the effect of the exothermic reaction without cooling.

The oligo-urethane ethers according to the invention may of course also be continuously produced. The hydroxyl component may be combined with the isocyanate in a statistical or dynamic straight-flow mixer, the reaction mixture being delivered from this mixer to a following stirrer-equipped vessel in which the reaction is completed, for example. Cascades of stirrer-equipped vessels or Zellar reactors are also suitable for continuously carrying out the polyaddition reaction.

If desired, the reaction may be accelerated by known catalysts commonly used in polyurethane chemistry, such as, for example, tertiary amines, amidines, metal hydroxides, alcoholates, phenolates or carboxylates or carboxylates and chelates of the transition metals.

Finally, solutions according to the invention are obtained by dissolving the oligo-urethanes in the relatively high molecular weight polyether polyols mentioned above using known mixing units.

Considerable importance is attached to the stoichiometric NCO/OH-ratio between the diisocyanate and the short-chain polyether diol in order to both obtain a clear solution of the oligo-urethane ethers in the relatively high molecular weights, polyfunctional polyether polyols and to maintain the viscosity preferably below 3500 mPas required for the production of flexible foams. As mentioned above, this ratio should amount to between 0.5 and 0.7 in the case of dialcohols having an average molecular weight of from 200 to 280, to between about 0.5 and 0.9 in the case of dialcohols having an average molecular weight of from 280 to 600 and to between about 0.5 and 0.75 in the case of dialcohols having an average molecular weight of from 600 to 800.

Although the high content of oligo-urethane ethers in the solution may amount to between 3 and 60%, by weight, concentrations of from 5 to 30% by weight are preferred. On the one hand, solutions of the type in question—in concentrations below 5%, by weight-—only bring about minimal changes in the properties of the polyurethane plastics produced from the solutions, while on the other hand, concentrations above 30%, by weight, can frequently give rise to high viscosities which have an adverse effect upon processing.

The solutions according to the invention are used in the usual way as modified polyether polyols for the production of flexible polyurethane foams. The flexible foams obtainable in this way may be welded very effectively by means of known welding machines and, in addition, are characterized by excellent overall properties.

Comparison in the production of flexible polyurethane foams of the oligo-urethane solutions according to the invention with other foam formulations (cf., Foaming Examples 6 through 9 with Examples 10 and 11), in which the polyether diols are used as additives or (together with polyether polyols of relatively high molecular weight) as urethane-modified polyols, proves the superiority of the former solutions. This advantage is reflected in particular in the safety of the foaming process, in the properties of the resulting foams and in the low viscosity of the polyol component.

The addition of corresponding quantities of linear dialcohol leads either to shrinkage or gives a foam characterized by poor mechanical properties (Foam Examples 10 and 11). If the addition of linear dialcohol and diisocyanate is carried out in polyether as the reaction medium (cf., Solutions B1 to B4), solutions of relatively high viscosity are obtained because of the subsequent reaction of the polyether. Further, if the reaction of dialcohol and diisocyanate were to be carried out in polyethers predominantly containing primary OH-terminated groups, the end products would have extremely high viscosities even despite very low solids contents.

In addition to the starting components already mentioned, water and/or other blowing agents, activators, and optionally, other known additives and auxiliaries of the type mentioned in the publications cited earlier (for example, on pages 25 to 31 of German Offenlegungsschrift No. 2,854,384) may be used in the production of flexible foams in accordance with the invention.

According to the invention, the reaction components are reacted by the known one-shot process, by the pre-polymer process or by the semi-prepolymer process, often using machines, for example of the type described in U.S. Pat. No. 2,764,565. Information on processing machines which may also be used in accordance with the invention can be found in Kunststoff-Handbuch, Vol. VII, by Vieweg and Hochtlen, Carl-Hanser-Verlag, Munich 1966, for example, on page 121 to 247.

In the production of foams, in accordance with the invention, foaming is often carried out with the reaction mixture introduced into a mold where it foams and forms the molding. Suitable mold materials include metals, such as aluminum, or plastics, such as epoxide resin. In-mold foaming may be carried out in such a way that the molding has a cellular structure at its surface, although it may also be carried out in such a way that the molding has a compact skin and a cellular core. In this connection, it is possible, in accordance with the invention, to introduce foamable reaction mixture into the mold in such a quantity that the foam formed just fills the mold. However, it is also possible to introduce into the mold more foamable reaction mixture than is required for filling the interior of the mold with foam (called "overcharging" and described, for example, in U.S. Pat. Nos. 3,178,490 and 3,182,104).

Where foaming is carried out in molds, known "external release agents" such as silicone oils, are frequently used. However, it is also possible to use so-called "internal release agents", optionally in admixture with external release agents, of the type known, for example, from German Offenlegungsschriften 2,121,670 and 2,307,589.

According to the invention, it is also possible to produce cold-hardening foams (cf., British Pat. No. 1,162,517 and German Offenlegungsschrift No. 2,153,086).

However, it is, of course, also possible to produce foams by block foaming or by the known laminator process.

The invention is illustrated by the following Examples in which the quantities quoted represent parts by weight or percentages by weight, unless otherwise indicated.

The designations used have the following meanings:
Dialcohol I: polypropylene oxide having an OH-number of 515
Dialcohol II: polypropylene oxide having an OH-number of 265
Dialcohol III: polypropylene glycol ethoxylate (15% of ethylene oxide units at the chain ends) having an OH-number of 150
Glycol (b) I: polypropylene ether diol, OH-number 515
Glycol (b) II: polypropylene ether diol, OH-number 265
Polyether I: started with 90% glycerol and 10% 1,2-propylene glycol; 10% ethylene oxide and 90% propylene oxide in the chain; more than 95 mole percent of secondary OH-groups; OH-number 46
Polyether K: started with 90% glycerol and 10% 1,2-propylene glycol; 10% of ethylene oxide and 90% of propylene oxide units in the chain; OH-number 46
Polyether L: started with trimethylol propane, 18% of ethylene oxide and 82% of propylene oxide units in the chains; approximately 90 mole percent of primary OH-terminal groups, OH-number 35.

TDI 65: tolylene diisocyanate (65% 2,4-and 35% 2,6-isomer)
TDI 80: tolylene diisocyanate (80% of 2,4-and 20% of 2,6-isomer)
MDI: diphenyl methane-4,4'-diisocyanate
HDI: 1,6-hexamethylene diisocyanate

EXAMPLES

1. Production of the solutions

EXAMPLE A 1

69.6 (=0.4 mole) of tolylene diisocyanate (TDI 80) are added over a period of 10 to 15 minutes at 90° to 100° C. to 211.5 g (≙0.5 mole) of a polypropylene oxide having an OH-number of 265. The reaction mixture is then stirred at 100° C. until no more NCO-groups can be detected (2 to 5 hours). The oligo-urethane ether formed is then stirred into 2530 g of Polyether K heated to 100° C. The clear solution (solids content 10%) has a viscosity of 1100 mPas at 25° C.

The following solutions of oligo-urethanes in polyethers of relatively high molecular weight are prepared in exactly the same way.

2. COMPARISON EXAMPLES B 2 and B 4

EXAMPLE B 2

87 g of TDI 80 (≙0.5 mole) are added at 100° C. to 217.9 g (≙1 mole) of dialcohol I and 1219.6 g of Polyether K, followed by stirring for 5 hours. The clear solution (solids content 20%) has a viscosity of 2450 mPas at 25° C.

Solution B 4 is prepared in exactly the same way.
Alcohol component: Dialcohol II
Isocyanate component: TDI 80
Molar ratio of dialcohol to diisocyanate: 7:6
High molecular weight polyether: Polyether K
Solids content: 20%
Viscosity at 25° C.: 5750 mPas.

3. APPLICATION EXAMPLES

Production of flexible polyurethane foams

Flexible foams were produced from solutions A 1 to A 5, B 1 to B 4 and C 1 to C 9. In each case, flexible foams were produced by the hand foaming process (through mixing of the polyols with stabilizer, water and activator; then addition of the isocyanate; and foaming after further mixing in a paper packet).

The foams obtained were welded with a flat electrode 1 cm wide and 10 cm long (surface area 10 cm$^2$) under a pressure of 9 kp/cm$^2$ using 10 mm thick foam sheets (foam/foam) and a composite system of a polyamide velours, 8 mm foam sheet and a polyamide Charmeuse. The welding voltage was 650 V and the current 480 mA. The HF-welding unit used was an HG 600 S high-frequency generator (manufactured by the Herfurth Company of Hamburg-Altona). The frequency was 27.12 MHz and the generator output 600 W.

| Solution | Dialcohol | Diisocyanate | Molar Ratio of dialcohol to diisocyanate | Relatively high molecular weight polyether | Solids Content | Viscosity at 25° C. (mPas) |
| --- | --- | --- | --- | --- | --- | --- |
| A 2 | II | TDI 80 | 5:4 | K | 20% | 3000 |
| A 3 | II | TDI 80 | 5:4 | K | 30% | — |
| A 4 | II | MDI | 4.5:5.5 | K | 10% | 1350 |
| A 5 | II | MDI | 4.5:5.5 | K | 20% | 3500 |
| B 1 | I | TDI 80 | 2:1 | K | 20% | 1400 |
| B 3 | II | TDI 80 | 7:6 | K | 20% | 2700 |
| C 1 | II | MDI | 3:2 | K | 20% | 1915 |
| C 2 | II | HDI | 3:2 | K | 20% | 935 |
| C 3 | III | TDI 80 | 2:1 | K | 20% | 755 |
| C 4 | II | TDI 80 | 4:3 | K | 20% | 1810 |
| C 5 | II | TDI 80 | 4:3 | K | 30% | 3510 |
| C 6 | II | TDI 80 | 4:3 | K | 40% | 8275 |
| C 7 | II | TDI 80 | 4:3 | L | 20% | 2300 |
| C 8 | I | TDI 80 | 2:1 | L | 20% | 1990 |
| C 9 | II | MDI | 4:3 | L | 20% | 3508 |

3. A Production of flexible, open-cell foams from PU—solutions in polyethers with variation of the quantity of polyurethane dissolved and with variation of the diisocyanate to be used for the oligo-urethanes and of the molar ratio of glycol to isocyanate

| FOAMING EXAMPLE | 1 | 2 | 3 | 4 | 5 | |
| --- | --- | --- | --- | --- | --- | --- |
| A 1 | 100 | — | — | — | — | |
| A 2 | — | 100 | — | — | — | |
| A 3 | — | — | 100 | — | — | |
| A 4 | — | — | — | 100 | — | |
| A 5 | — | — | — | — | 100 | |
| Water | 2.5 | 2.5 | 2.5 | 2.5 | 2.5 | |
| Standard commercial flexible foam stabilizer (polyalkylene glycol/siloxane copolymer) | 0.7 | 0.7 | 0.7 | 0.7 | 0.7 | |
| Dimethyl ethanolamine | 0.8 | 0.8 | 0.8 | 0.7 | 0.7 | |
| Standard commercial flexible foam activator (PS 207, a product of Bayer AG) | — | — | — | 0.1 | 0.1 | (OS-22-Bayer AG, Leverkusen - Germany) |
| Tin (II) octoate | — | — | — | 0.1 | 0.1 | |
| TDI 80 | 33.6 | 33.5 | 16.8 | 33.6 | 33.6 | |
| TDI 65 | — | — | 16.8 | — | — | |
| TDI-Index | 105 | 105 | 105 | 105 | 105 | |
| Gross Density (kg/m$^3$) | 36 | 37 | 37 | 37 | 36 | |
| Tensile strength (KPa) | 110 | 160 | 125 | 125 | 165 | |

-continued

3. A Production of flexible, open-cell foams from PU—solutions in polyethers with variation of the quantity of polyurethane dissolved and with variation of the diisocyanate to be used for the oligo-urethanes and of the molar ratio of glycol to isocyanate

| FOAMING EXAMPLE | 1 | 2 | 3 | 4 | 5 |
|---|---|---|---|---|---|
| Breaking elongation (%) | 225 | 345 | 210 | 270 | 310 |
| Compression hardness (KPa) | 3.3 | 3.45 | 4.7 | 3.75 | 4.0 |
| CS 90% (%) | 9.3 | 5.3 | 3.5 | 6.0 | 8.8 |
| Weldability foam/foam (sec.)[1] | 10 | 8 | 6 | 10 | 8 |
| Weldability foam/polyamide textile (sec.)[2] | 2.5 | 2.0 | 1.5 | 2.3 | 2.1 |
| Standard polyether foam of gross density 35 kg/m$^3$ | | | | | |

[1] >20
[2] 7

3. (B) Comparison of the foaming of solutions of polyurethane ethers diols produced beforehand in segmented form with the foaming of PU—solutions produced in non-segmented form in a polyol as reaction medium and with the addition of corresponding quantities of glycol during the foaming reaction

| FOAMING EXAMPLE | 6 | 7 | 8 | 9 | 10 | 11 |
|---|---|---|---|---|---|---|
| B 1 | 100 | — | — | — | — | — |
| B 2 | — | 100 | — | — | — | — |
| B 3 | — | — | 100 | — | — | — |
| B 4 | — | — | — | 100 | — | — |
| Polyether I | — | — | — | — | 100 | 100 |
| Glycol I | — | — | — | — | 17.4 | — |
| Glycol II | — | — | — | — | — | 18.5 |
| Water | 2.5 | 2.5 | 2.5 | 2.5 | 2.5 | 2.5 |
| Standard commercial flexible foam stabilizer (polyalkylene glycol/siloxane copolymer) | 0.7 | 0.7 | 0.7 | 0.7 | 0.7 | 0.7 |
| Dimethyl ethanolamine | 0.8 | 0.8 | 0.8 | 0.8 | 0.2 | 0.2 |
| Standard commercial flexible foam activator (PS 207, a product of Bayer AG) | 0.15 | 0.15 | 0.15 | 0.15 | 0.3 | 0.3 |
| Tin (II) octoate | 0.05 | 0.05 | 0.12 | 0.1 | 0.05 | 0.15 |
| TDI 80 | 38.9 | 38.9 | 34.1 | 34.1 | 48.8 | 41.7 |
| TDI 65 | — | — | — | — | — | — |
| TDI-Index | 105 | 105 | 105 | 105 | 105 | 105 |
| Gross Density (kg/m$^3$) | 38 | 39 | 37 | 37 | shrinkage occurred | 39 |
| Tensile strength (KPa) | 225 | 220 | 140 | 115 | | 150 |
| Breaking elongation (%) | 350 | 260 | 325 | 260 | | 360 |
| Compression hardness 40% (KPa) | 3.2 | 4.31 | 3.23 | 4.17 | | 2.8 |
| CS 90% (%) | 82 | 88 | 7.6 | blocks | | blocks |
| Weldability foam/foam (sec.) | 5 | 5 | 10 | 10 | | 10 |
| Weldability foam/polyamide textile (sec.) | 2 | 2 | 2.3 | 2.3 | | 2.3 |
| Open cellularity (scale parts*) | 120 | 300 | 200 | 320 | | 300 |

*Open cellularity was determined by a method normally used by Applicants (principle: flow resistance to a standardized gas stream, the pressure built up is measured against a water column).
Scale: completely open-cell foam: 0   completely closed-cell-foam: >350
A standard commercial open-cell polyether foam lies between 50 and 150 on this scale.

3. (C) Production of flexible, open-cell foams from oligo-urethane-PU—solutions in polyethers with variation (a) of the isocyanate used for production of the oligo-urethane; (b) of the glycol component used for production of the oligo-urethane; (c) of the molar ratio of glycol to isocyanate; (d) of the concentration of the dissolved oligo-urethane; and (e) of the starting polyether used for dissolution

| FOAMING EXAMPLE | 12 | 13 | 14 | 15 | 16 | 17 | 18 | 19 | 20 |
|---|---|---|---|---|---|---|---|---|---|
| C 1 | 100 | — | — | — | — | — | — | — | — |
| C 2 | — | 100 | — | — | — | — | — | — | — |
| C 3 | — | — | 100 | — | — | — | — | — | — |
| C 4 | — | — | — | 100 | — | — | — | — | — |
| C 5 | — | — | — | — | 100 | — | — | — | — |
| C 6 | — | — | — | — | — | 100 | — | — | — |
| C 7 | — | — | — | — | — | — | 100 | — | — |
| C 8 | — | — | — | — | — | — | — | 100 | — |
| C 9 | — | — | — | — | — | — | — | — | 100 |
| Water | 2.5 | 2.5 | 2.5 | 2.5 | 2.5 | 2.5 | 2.5 | 2.5 | 2.5 |
| Standard commercial flexible foam stabilizer (polyalkylene glycol/siloxane copolymer) | 0.7 | 0.7 | 0.7 | 0.7 | 0.7 | 0.7 | 0.7 | 0.7 | 0.7 |
| Dimethyl ethanolamine | 0.7 | 0.7 | 0.7 | 0.7 | 0.7 | 0.7 | 0.7 | 0.7 | 0.7 |
| Standard commercial flexible foam activator (PS 207, a | 0.15 | 0.15 | 0.15 | 0.15 | 0.15 | 0.15 | 0.15 | 0.15 | 0.15 |

-continued 3. (C) Production of flexible, open-cell foams from oligo-urethane-PU—solutions in polyethers with variation (a) of the isocyanate used for production of the oligo-urethane; (b) of the glycol component used for production of the oligo-urethane; (c) of the molar ratio of glycol to isocyanate; (d) of the concentration of the dissolved oligo-urethane; and (e) of the starting polyether used for dissolution

| FOAMING EXAMPLE | 12 | 13 | 14 | 15 | 16 | 17 | 18 | 19 | 20 |
|---|---|---|---|---|---|---|---|---|---|
| product of Bayer AG) | | | | | | | | | |
| Tin (II) octoate | 0.15 | 0.15 | 0.12 | 0.12 | 0.1 | 0.08 | 0.03 | 0.15 | 0.2 |
| TDI 80 | 34.8 | 35.1 | 35.0 | 34.4 | 34.5 | 34.7 | 32.4 | — | — |
| TDI 65 | — | — | — | — | — | — | — | 36.7 | 32.4 |
| TDI-Index | 105 | 105 | 105 | 105 | 105 | 105 | 105 | 105 | 105 |
| Gross density (kg/m$^3$) | 35 | 36.5 | 36.5 | 37 | 36 | 37 | 41 | 41 | 39 |
| Tensile strength (KPa) | 155 | 110 | 115 | 140 | 120 | 140 | 135 | 170 | 140 |
| Breaking elongation (%) | 345 | 180 | 340 | 330 | 210 | 280 | 310 | 420 | 330 |
| Compression hardness 40% (KPa) | 3.2 | 3.0 | 3.0 | 3.2 | 3.2 | 3.45 | 3.7 | 4.2 | 5.6 |
| CS 90% (%) | 6.0 | 6.1 | 4.4 | 6.0 | 18 | 23 | 89 | 28 | 88 |
| Weldability foam/foam (sec.) | 7 | 10 | 15 | 8 | 7 | 5 | 9 | 7 | 8 |
| Weldability foam/polyamide textile (sec.) | 2 | 2.5 | 3.2 | 2.3 | 2.0 | 1.4 | 2.5 | 2.0 | 2.0 |

What is claimed is:

1. Solutions of
   (A) from 3 to 60%, by weight, based on the combined ether-polyol content, of separately prepared oligo-urethane ethers containing terminal OH-groups in the form of reaction products of
      (a) diisocyanates with
      (b) short-chain polyether diols having an average molecular weight of from 200 to 800, the stoichiometric ratio of (a) to (b) amounting to between 0.5 and 0.7 in the case of diols having an average molecular weight of from 200 to 280; to between 0.5 and 0.9 in the case of diols having an average molecular weight in the range from 280 to 600; and to between 0.5 and 0.75 in the case of diols having an average molecular weight of from 600 to 800,
   in
   (B) polyether polyols containing at least two hydroxyl groups and having an average molecular weight from 1000 to 12,000.

2. Solutions as claimed in claim 1, characterized in that polypropylene glycols having an average molecular weight of from 200 to 600 are used as the dialcohol.

3. Solutions as claimed in claims 1 or 2, characterized in that 2,4- and/or 2,6-tolylene diisocyanate and/or diphenyl methane-2,4'- and/or -4,4'-diisocyanate are used as the diisocyanate.

4. A process for the production of flame-laminatable and high-frequency-weldable flexible polyurethane foams by involving reacting
   (i) polyisocyanates;
   (ii) relatively high molecular weight compounds containing at least two hydroxyl groups;
   (iii) optionally other relatively high molecular weight and/or low molecular weight compounds containing isocyanate-reactive hydrogen atoms and water;
   (iv) optionally, in the presence of other blowing agents, catalysts, foam stabilizer and other additives,
characterized in that the solutions claimed in claim 1 are exclusively or partly used as the relatively high molecular weight compounds containing hydroxy groups.

* * * * *